Aug. 29, 1961        A. POGUE ET AL        2,997,796
       COMBINATION SNOW PLOW AND DEICING SPREADER
Filed April 8, 1960                      3 Sheets-Sheet 1
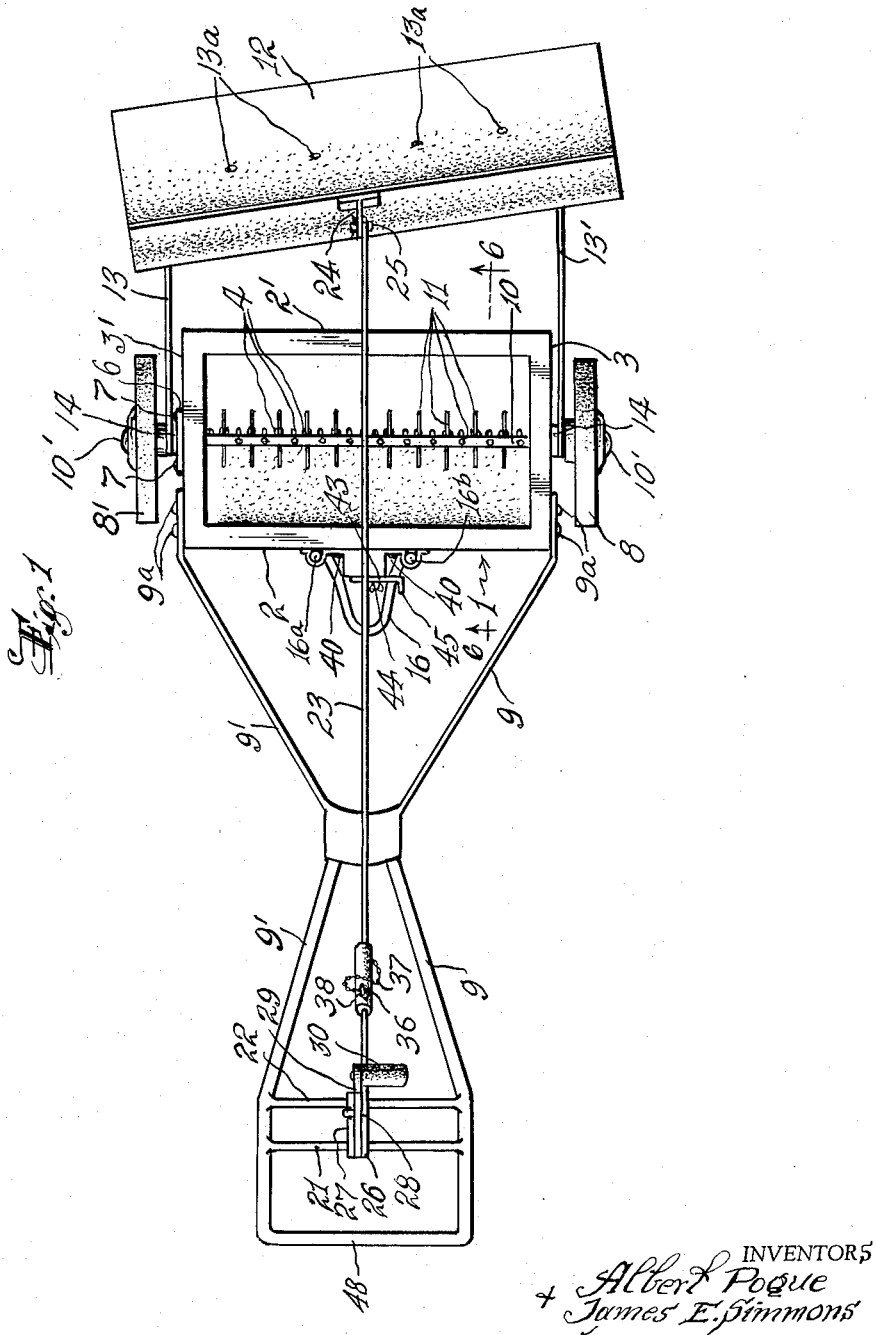
INVENTORS
Albert Pogue
James E. Simmons
BY
ATTORNEY

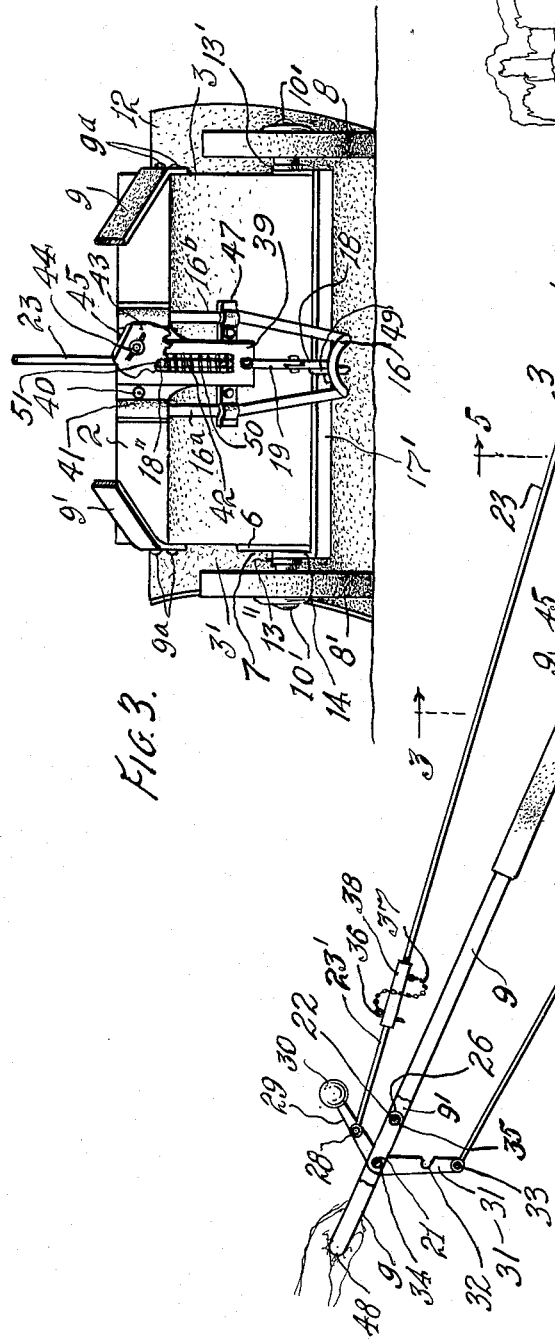

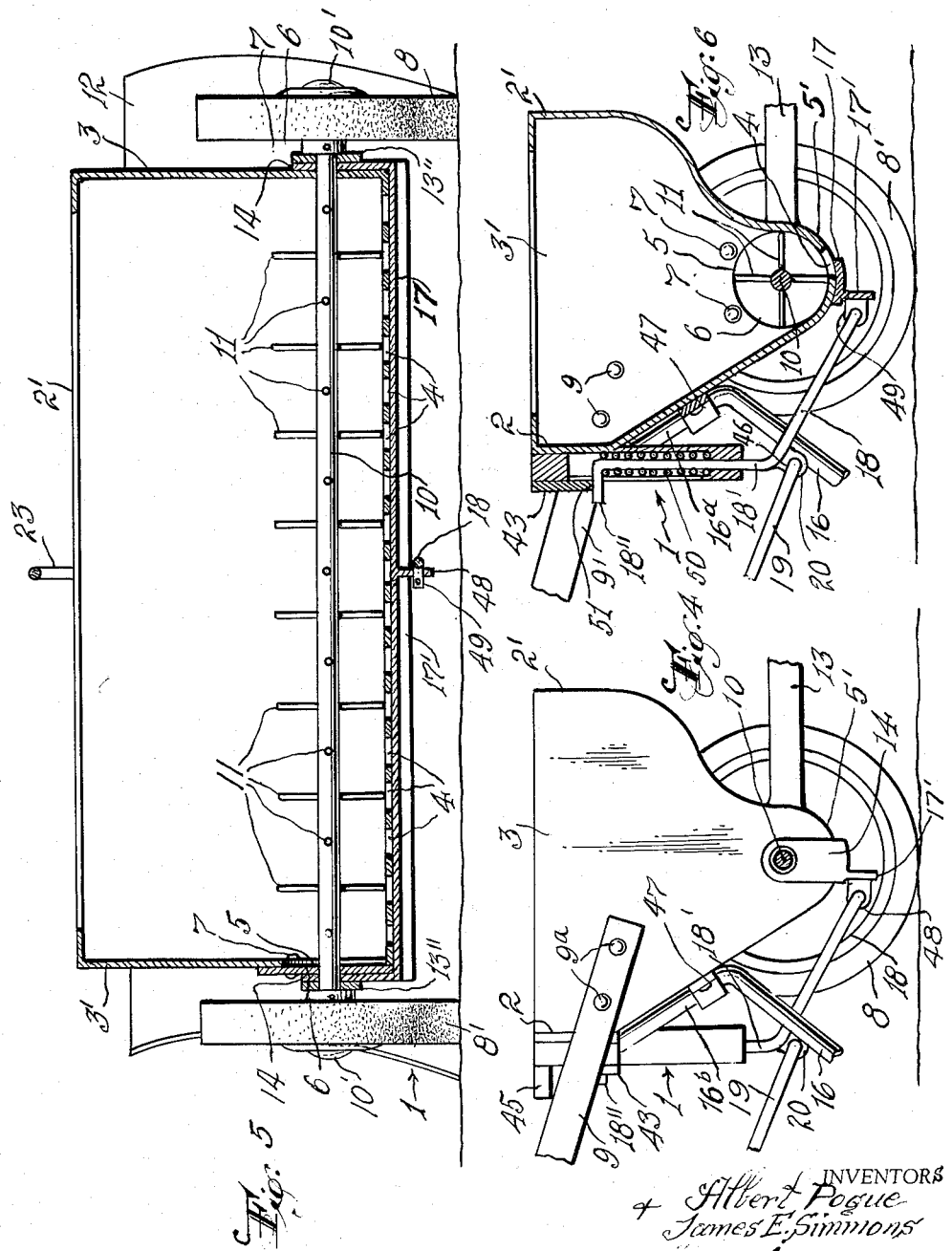

2,997,796
COMBINATION SNOW PLOW AND DEICING SPREADER

Albert Pogue, 411 E. 9th Ave., Roselle, N.J., and James E. Simmons, 1209 McCandless St., Linden, N.J.
Filed Apr. 8, 1960, Ser. No. 21,024
4 Claims. (Cl. 37—16)

This invention deals with a combination snow plow and deicing spreader adapted to plow snow and to spread salt or other material over the plowed area. More specifically, it relates to a snow plow-deicing spreader having means for simultaneously cutting off the spreader as the plow is raised, and vice versa.

In the prior art, snow plows have been mounted on wheels for propulsion by hand when cleaning sidewalks, driveways, and the like. Usually, there is need for application of a deicing material, such as rock salt, after the snow has been cleared from the area to be used. This salt not only provides better traction for people and vehicles, but it also removes the bottom layer of ice and likewise tends to liquefy the snow falling on the treated surface. Such application of salt has been done in a separate operation, usually by scattering by hand, a wasteful and inefficient method.

According to the present invention, it is possible to deposit uniformly a granular deicing material, such as rock salt, simultaneously while removing the snow with the plow. Also, it is possible to cut off the salt distribution simultaneously with the lifting of the plow off the ground when the plowing operation has been completed.

The invention will be more readily understood by reference to the drawings in which a preferred embodiment of the invention is described and in which FIGURE 1 illustrates a top or plan view of a combination snow plow and deicing spreader of the present invention. A side view thereof is shown in FIGURE 2, while FIGURE 3 depicts a cross-sectional rear view along line 3—3 of FIGURE 2. A side view thereof is portrayed in FIGURE 4. FIGURE 5 presents a cross-sectional rear view taken along line 5—5 of FIGURE 2, while FIGURE 6 illustrates a cross-sectional side view taken along line 6—6 of FIGURE 1.

Referring again to the drawings, numeral 1 represents generally a hopper having back 2, front 2', and sides 3 and 3'. Hopper 1 has a curved bottom 5' (FIG. 6) which is perforated with a row of holes 4 through which salt or other granular material may be distributed to the ground. Handles 9 and 9', are attached to sides 3 and 3', respectively, by bolts 9a. The upper portions of the handles are connected by crossarm 48.

Wheels 8 and 8' are attached to shaft 10 and held thereon by nuts 10'. Inside hopper 1, shaft 10 (which penetrates sides 3 and 3') is provided with radially-projecting pins or spines 11 which break up agglomerated lumps of salt or similar material as the shaft is rotated, to facilitate distribution thereof through holes 4. Side 3' is provided with opening 5 around shaft 10 to enable withdrawal of the shaft therethrough after nut 10' and wheel 8 are removed. When shaft 10 is mounted in place in hopper 1, plate 6 is used to cover opening 5, the plate being fastened to side 3' by bolts 7.

Curved plate 17 is used as a cover for the row of holes 4 and is disposed under the bottom of hopper 1. This cover plate has turned up ends or arms 14 which form a bearing around shaft 10, enabling arms 14 to swivel a short distance thereon. Cover plate 17 also is provided with a downwardly-projecting fin 17' to which is swivelly mounted rod 18 at 48 (using a pin to lock the turned end 49).

Attached to the upper portion of back 2 (by screws 40) is a hollow housing 39, the front of which is provided with a vertically-directed slot 50 in which rides curved-out end 18" of vertically-bent section 18' of rod 18. This end 18" is spring loaded by spring 42 which latter tends to keep end 18" up against grooves or stops 51 of adjustment plate 43 adjustably mounted over housing 39 and held fast by thumb screw and nut 44. Movement of this plate determines the slot of plate 43 into which rod 18" will rest, and this determines the amount of openings 4 uncovered by plate 17. It is apparent that movement of rod 18—18'—18" causes arcuate movement of cover plate 17, so that, by turning guide 43 around screw 44 as an off-center pivot, and end 18" (which fits into one of the grooves 51) of rod 18 can be limited as to the extent of upward motion, and thus it is possible to limit the extent of coverage of plate 17 over holes 4, to control the amount of salt or other material distributed through holes 4.

A bent rod 16, having ends 16a and 16b locked under housing ends 41 serves as a support for hopper 1 when it is in idle condition. Adjustment plate 43 is provided with turned-up end 45 for facilitating movement thereof by thumb or fingers.

Attached in front of and at an angle to hopper 1 is snow plow 12. Support arm 13' attached to plow 12 at 13a is pivoted at its other end 13" (FIG. 5) which serves as a bearing around shaft 10 and enables raising or lowering the plow off the ground. The other support arm 13 is shorter than arm 13', whereby the said angularity is obtained.

Mounted below handle crossarm 48 are two crossarms 21 and 22 carrying parallel mounting plates 26 and 27 between which is pivoted vertical lever 29 having forwardly and downwardly bent extension 31. The upper end of lever 29 is provided with hand knob 30 enabling limited vertical rotation by hand of the lever on crossarm 21 as a pivot. Pivotally attached to the end of extension 31 at 33 is the end of rod 19. Also, pivotally attached near the midpoint of lever 29, at 28, is the end of link 23' which latter link fits telescopically into link 23 and may be locked therein by pin 36 held by chain 37, the other end of which chain is fastened at 38 to link 23. The hole provided in telescopic member 38 and holes in rod 23' enable fixing the position of plow 12 so that it may be raised in position while salt is being spread from hopper 1, if desired. Also, by use of another hole in rod 23' for pin 36, it is possible to keep the plow down in plowing position with hopper 1 closed. Extension 31 of lever 29 is provided with a cut-out portion 32 designed to straddle movement-limiting crossarm 22 when lever 29 is moved to its upward position.

Rod 19 is pivotally attached to boss 20 at 46, said boss being affixed to rod 18. Also, the end of link 23 is pivotally attached at 25 to fin 24 projecting from plow 12. Thus, it is apparent that when knob 30 of lever 29 is pulled to the raised position, link 23—23' raises plow 12 off the ground. Simultaneously, rod 19 pushes rod 18, and cover plate 17 completely closes holes 4, preventing any further distribution of salt or other material on the ground.

When the combination of the invention is to be used, knob 30 is raised so that openings 4 are covered by plate 17 and plow 12 is raised off the ground. Hopper 1 is filled with rock salt and the unit is wheeled to the area to be cleared. Then, knob 30 is pushed down, as in FIGURE 2, whereupon plow 12 is lowered to contact the ground and plate 17 is pulled away from openings 4 in the bottom of hopper 1 to the set limit of adjusting grooves 51 (FIG. 3). Thereafter, the unit is wheeled forwardly through the snow. Plow 12 pushes the snow to the side and pins 11 on shaft 10 stir and break up the salt agglomerates as the salt is distributed through holes 4.

When the plowing is completed, knob 30 is raised, as in FIGURE 1, whereby openings 4 are closed and plow 12 is raised.

If it is desired to use hopper 1 during the summer for distributing fertilizer, or the like, plow 12 may be readily removed by pulling pin 36 to break link 23, then removing wheels 8 and 8′ and spreading arms 13 and 13′ until they are off shaft 10. Thereafter, the wheels are replaced.

We claim:

1. A combination snow plow and deicing spreader comprising a hopper for holding granular deicing material and having sides, a front, a back and a lineally-perforated bottom, a rotatable shaft mounted on and penetrating said sides and disposed above said bottom, a cover plate disposed under said bottom, arms extending from each side of said plate and swivelly attached to said shaft in a manner to permit closing or opening of said bottom by movement of said plate, a wheel mounted on each end of said shaft outside said sides, a handle extending from said back to permit pushing or pulling of said hopper, a snow plow disposed in front of said hopper, a support extending from said plow on each side of said hopper and swivelly attached to said shaft, a lever mounted on said handle in a manner to permit vertical movement thereof around a horizontal pivot, a downwardly-directed extension on said lever, a link pivotally-attached on one end to said lever and on the other end to said plow in a manner enabling raising of said plow when said lever is turned on its pivot and a rod pivotally attached on one end to said extension and on the other end to said cover plate in a manner enabling closing of said perforated bottom as said plow is raised by said turning of said lever.

2. A combination snow plow and deicing spreader according to claim 1 in which the handle has attached thereto two horizontal crosspieces, one of which is designed to serve as said pivot and the other as a stop for said extension.

3. A combination snow plow and deicing spreader according to claim 1 in which said shaft has, radially attached thereto, a series of spines designed to break up agglomerated deicing material.

4. A combination snow plow and deicing spreader according to claim 1 in which said back has attached thereto cover plate adjusting means for controlling the amount of discharge of said material out of said perforated bottom, a rigid connection between said adjusting means and said plate, and pivot connection means on said connection for pivotally connecting said other end of said rod with said connection.

References Cited in the file of this patent

UNITED STATES PATENTS

| | | |
|---|---|---|
| 2,032,487 | Lloyd | Mar. 3, 1936 |
| 2,799,510 | Schmidt | July 16, 1957 |
| 2,839,223 | Liljenberg | June 17, 1958 |